United States Patent [19]

Morita

[11] Patent Number: 4,902,143
[45] Date of Patent: Feb. 20, 1990

[54] RECTILINEAR MOTION ROLLING GUIDE UNIT

[75] Inventor: Kunihiko Morita, Koganei, Japan

[73] Assignee: Nippon Thompson Co., Ltd., Tokyo, Japan

[21] Appl. No.: 397,678

[22] Filed: Jul. 24, 1989

[30] Foreign Application Priority Data

Dec. 19, 1988 [JP] Japan .................... 63-318650

[51] Int. Cl.⁴ ............................. F16C 31/06
[52] U.S. Cl. ......................... 384/43; 384/44; 384/45
[58] Field of Search .............. 384/43, 44, 45, 451; 464/168

[56] References Cited

U.S. PATENT DOCUMENTS

| 4,563,045 | 1/1986 | Katayama | 384/44 |
| 4,582,369 | 4/1986 | Itoh | 384/45 X |
| 4,799,805 | 1/1989 | Tanaka | 384/44 |

Primary Examiner—Andres Kashnikow
Assistant Examiner—Virna Lissi Mojica
Attorney, Agent, or Firm—Rogers & Killeen

[57] ABSTRACT

A rectilinear motion rolling guide unit comprises: a long track rail having an I-shaped cross section; a casing having an inverse U-shaped cross section; and rolling elements interposed between the track rail and the casing. The casing rides over the track rail through a cavity portion having an inverse U-shaped cross section formed in the central lower portion of the casing. The corners of the upper and lower projecting portions on both sides of the rail are chamfered into inclined surfaces, thereby forming two upper and lower rail side track surfaces. Two upper and lower casing side track surfaces are formed on the inner peripheral surfaces of the cavity portion at the positions corresponding to the rail side track surfaces. The rolling elements are interposed between the opposite rail side and casing side track surfaces, respectively, thereby allowing the relative free slide motion to be executed between the track rail and the casing. Return passageways are formed in the casing. Two direction turning passageways for the rolling elements which roll on the casing side track surfaces are formed in the side plate. Two side plates are attached to both ends in the longitudinal direction of the casing. The casing side track surfaces and the return passageways are coupled, thereby forming two endless rolling element circulating passageways which perpendicularly cross into the casing. Lengths of load track surfaces of the circulating passageways are equal. Balls roll on one of the load track surfaces and the rollers which are arranged in parallel roll on the other load track surface.

4 Claims, 4 Drawing Sheets

RECTILINEAR MOTION ROLLING GUIDE UNIT

BACKGROUND OF THE INVENTION

1. Field of the Invention

The present invention relates to a rectilinear motion rolling guide unit in which rollers or balls are used as rolling elements in a rectilinear motion rolling guide unit and a track rail and a slide unit which rides over the track rail are rectilinearly guided and moved by a rolling friction.

2. Description of Related Background Art

As a conventional similar guide unit, there has been proposed a rectilinear motion rolling guide unit of the parallel type in which total four roller endless circulating passageways of two upper right and left and two lower right and left passageways are provided in the casing as disclosed in Japanese Patent Application No. 62-330195. Such a type of unit has a feature in which a load capacity can be extremely increased as compared with that of a conventional well-known type unit in which the ball rolling elements roll in four endless circulating passageways. However, there is a drawback such that since the rollers themselves are expensive, the cost of the whole unit is also high.

SUMMARY OF THE INVENTION

It is an object of the present invention to eliminate the drawbacks in the foregoing conventional technique and to provide a cheap small rectilinear motion rolling guide unit in which ball rolling elements and roller rolling elements which are arranged in parallel are respectively inserted to two upper and lower rolling element track surfaces, and particularly preferably, the cheap ball rolling elements are used for the upper track surfaces, the roller rolling elements are used for the lower track surfaces, an upward weight is loaded by the ball rolling elements, and a downward weight is loaded by the roller rolling elements, so that the excellent load characteristic and the high rectilinear motion rolling accuracy are obtained and the manufacturing cost is low.

According to one aspect of the present invention, the above object is accomplished by a rectilinear motion rolling guide unit comprising: a long track rail having an almost I-shaped cross section; a casing having an almost inverse U-shaped cross section; and a number of rolling elements which are interposed between the track rail and the casing, wherein the casing has a cavity portion having an almost inverse U-shaped cross section in an almost central lower portion of the casing and is arranged so as to ride over the track rail through the cavity portion, lower corner portions of upper projecting portions and upper corner portions of lower projecting portions which are provided on both sides of the track rail are respectively chamfered into inclined surfaces, thereby forming two upper and lower rail side track surfaces, two upper and lower casing side track surfaces are formed on an inner peripheral surface of the cavity portion of the casing at positions corresponding to the two upper and lower rail side track surfaces, the rolling elements are inserted between the corresponding rail side and casing side track surfaces, thereby allowing the relative free slide motion between the track rail and the casing which rides over the track rail to be executed, rolling element return passageways for the two upper and lower casing side track surfaces are respectively formed in the casing, side plates each having two direction turning passageways for the rolling elements which roll and run on the two upper and lower casing side track surfaces are respectively attached to both end portions in the longitudinal direction of the casing, the two upper and lower casing side track surfaces and the return passageways corresponding thereto are respectively coupled, thereby forming two endless rolling element circulating passageways into the casing, the two endless circulating passageways are arranged so as to perpendicularly cross each other when they are seen in a cross sectional view of the casing, lengths of load track surfaces of the endless circulating passageways are set to be substantially equal, ball rolling elements are rolled on the load track surfaces and roller rolling elements which are arranged in parallel are rolled on the other load track surface.

According to another aspect of the invention, in the above guide unit, the two endless circulating passageways which are formed in the casing and are arranged so as to perpendicularly cross each other have two large and small circulating lengths, the small endless circulating passageway having the shorter length is completely enclosed in a loop of the large endless circulating passageway having the longer length, and lengths of the load track surfaces of the endless circulating passageways are set to be substantially equal.

According to still another aspect of the invention, in the above guide unit, in the two endless circulating passageways which are formed in the casing and are arranged so as to perpendicularly cross each other, the small endless circulating passageway having the shorter length and whose load track surface is located at the upper stage is completely enclosed in the loop of the large endless circulating passageway having the longer length and whose load track surface is located at the lower stage, the lengths of the load track surfaces of the endless circulating passageways are set to be substantially equal, the ball rolling elements are rolled on the upper load track surface and the roller rolling elements which are arranged in parallel are rolled on the lower load track surface.

According to still another aspect of the invention, the above guide unit further comprises a direction turning passageway spacer which forms the large and small endless circulating passageways into each of the side plates together with the load track surfaces and the return passageways, wherein the spacer is constructed by a single half circle-shaped inner wall load track surface of the direction turning passageway for the roller rolling elements for the large endless circulating passageway and an inner wall load track surface of the direction turning passageway for the ball rolling elements for the small endless circulating passageway, and the inner wall load track surface is formed so as to perpendicularly cross a turnnel-shaped concave portion formed in an almost central lower portion of the spacer.

According to the rectilinear motion rolling guide unit with the above construction of the present invention, the slide unit can be miniaturized, the downward weight can be loaded by the rollers, and the opposite upward weight can be loaded by the balls. Therefore, even if a heavy weight is applied to the slide unit from the upper position, the slide unit can smoothly easily move owing to the characteristic of the rollers.

The above and other objects and features of the present invention will become apparent from the following detailed description and the appended claims with reference to the accompanying drawings.

DETAILED DESCRIPTION OF PREFERRED EMBODIMENT

Figure 1:
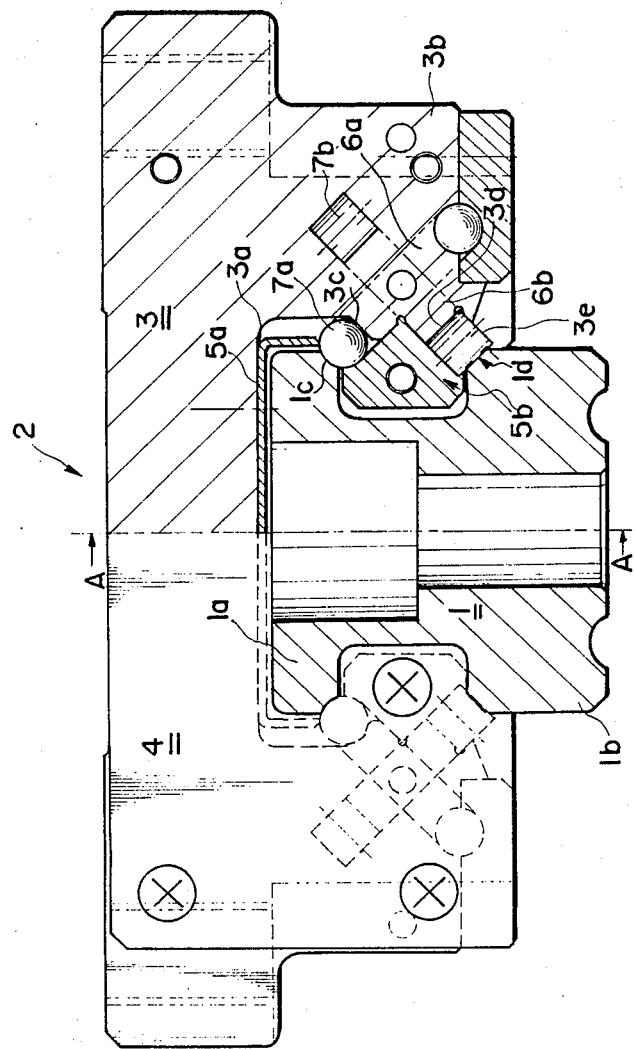
FIG. 1 is a front view of an embodiment of the present invention.

FIG. 1 shows a front view of a rectilinear motion rolling guide unit in a first embodiment of the present invention. The guide unit shown in the diagram mainly comprises: a long track rail 1 having an almost I-shaped cross section and having two right and left upper projecting portions 1a and two right and left lower projecting portions 1b; a casing 3 having an almost inverse U-shaped cross section which rides over the track rail 1; and rolling elements, practically speaking, a number of balls 7a and rollers 7b which are interposed between the track rail 1 and casing 3, respectively.

The casing 3 having the almost inverse U-shaped cross section has two right and left vertical depending portions 3b which are downwardly elongated and depend in the longitudinal direction at both end portions of the lateral axis. A cavity portion or groove 3a whose lower central portion is opened is formed between the vertical depending portions 3b. The cavity portion 3a has the shape corresponding to the upper portion of the track rail 1 and has cross sectional dimensions enough to enclose the upper portion thereof. Thus, the casing 3 is arranged so as to ride over the track rail 1 in a manner such that the casing 3 is slidable in the longitudinal direction through a number of rolling elements by the cavity portion 3a.

In the casing 3, holding plates 5a and 5b are attached to track surfaces on the inner surfaces of the cavity portion 3a and side plates 4 (refer to FIGS. 2 and 4) are respectively attached to both ends in the vertical axial direction, thereby constructing a slide unit 2.

In a further preferred embodiment of the invention, the track rail 1 has an almost I-shaped cross section. Each of the corner portions of the upper and lower portions of each of the upper and lower right and left projecting portions 1a and 1b is chamfered into an inclined surface. Practically speaking, the lower corner portion of the upper projecting portion 1a is chamfered into an inclined concave curved surface 1c for the ball rolling elements. The upper corner portion of the lower projecting portion 1b is chamfered into an inclined flat surface 1d for the roller rolling elements. In this manner, the track rail side track surfaces 1c and 1d are formed. On the other hand, on the inner peripheral surface of the cavity portion 3a of the casing 3, two upper and lower casing side track surfaces 3c and 3d having symmetrical cross sectional shapes are formed at the positions which face the two upper and lower track surfaces 1c and 1d on the track rail side, respectively. A number of rolling balls are interposed between the upper ball track surfaces 1c and 3c which face each other in the track rail 1 and casing 3. Likewise, a number of rollers which are arranged in parallel are also interposed between the lower roller track surfaces 1d and 3d which face each other in the track rail 1 and casing 3. Load rectilinear motion rolling guide units are provided by the opposite track surfaces, respectively.

By constructing the load tracks between the slide unit 2 and the track rail 1, a downward weight can be loaded by the rollers and an opposite upward weight can be loaded by the balls. Therefore, according to the guide unit of the invention, even when a heavy object is put on the slide unit, it can be smoothly moved and a large downward weight can be loaded owing to the characteristic of the rollers.

Figure 2:
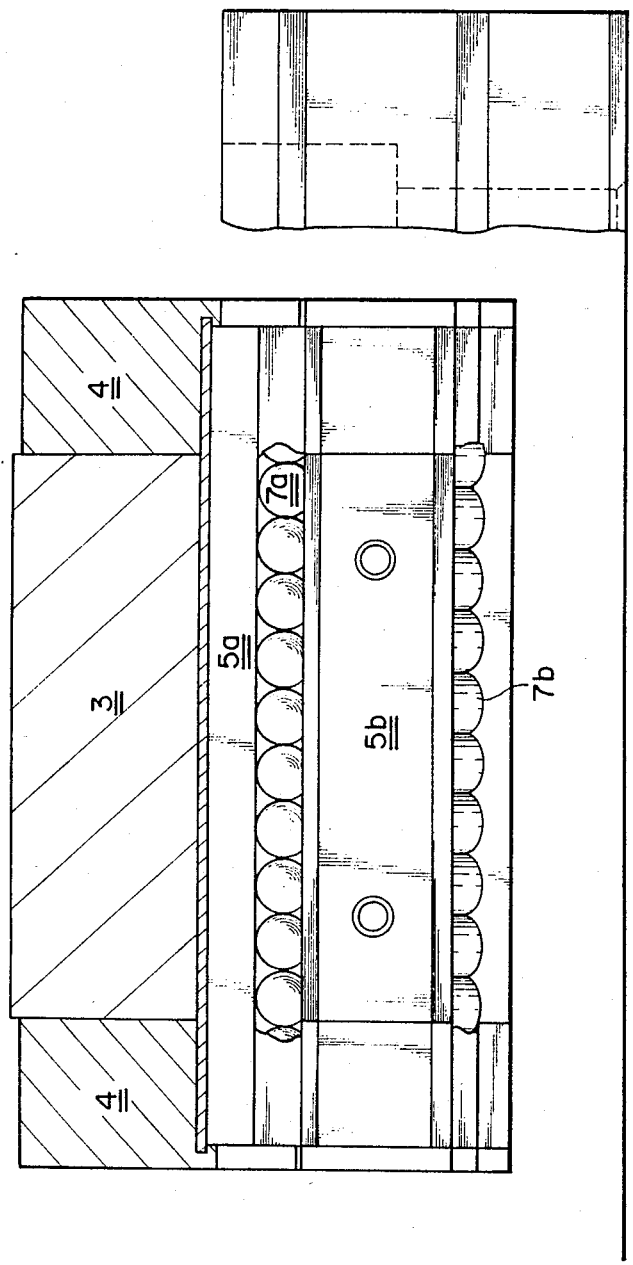
FIG. 2 is a side elevational view taken along the line A—A in FIG. 1 showing only a slide unit in the embodiment shown in FIG. 1.
Figure 3:
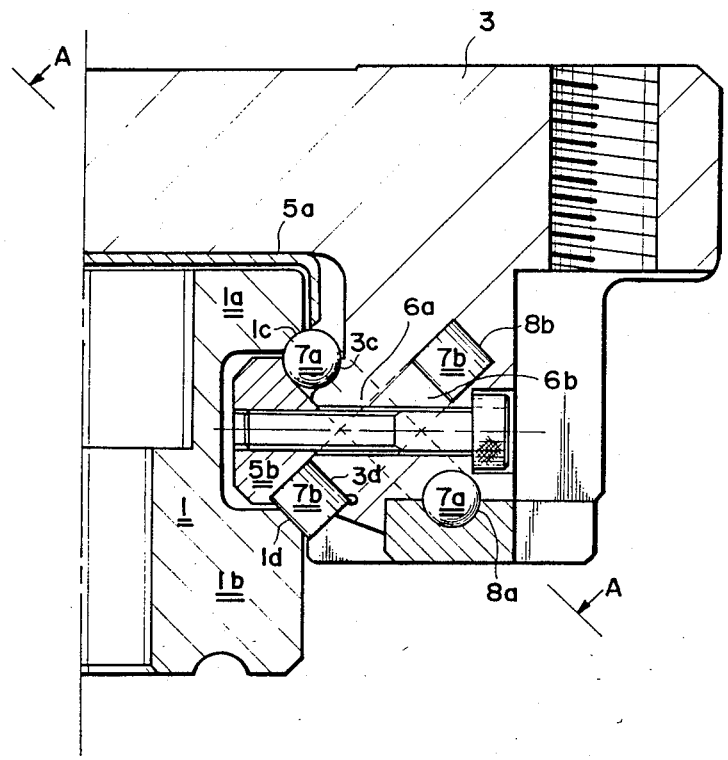
FIG. 3 is an enlarged front view of the right half portion of the embodiment in FIG. 1.

As shown in FIGS. 2 and 3, the balls 7a and rollers 7b are held onto the track surface 3c and 3d on the casing side by the holding plates 5a and 5b, respectively. However, the holding plate 5a comes into contact with the upper inner peripheral surface of the cavity portion 3a of the casing of the slide unit. Both ends in the axial direction of the holding plate 5a are inserted and fixed to the side plates 4 which are attached to both end portions of the casing 3, which will be explained hereinlater. Various methods can be also obviously used as a method of fixing the holding plate 5a with the slide unit.

The load rollers locating on the lower track surface 3d of the casing 3 are held by the holding plate 5b and a guide surface 3e formed on the track surface of the casing 3 on the side opposite to the holding plate 5b. The load rollers are moved to a direction turning passageway in the side plate 4 by a scooping portion formed on the side plate 4.

As shown in FIG. 3, it is preferable that the lower holding plate 5b is fixed to the casing by using attaching bolts inserted from the outside of the casing. With such a construction, it is prevented that the rolling elements are dropped from the track surfaces 3c and 3d on the casing side when the casing 3 is detached from the rail 1.

Return passageways 8a and 8b of the two upper and lower track surfaces 3c and 3d on the casing side are provided in the casing 3, respectively. On the other hand, two direction turning passageways 6a and 6b corresponding to the return passgeways 8a and 8b are formed in the side plate 4. When the side plates 4 are attached to both end portions of the casing 3, the two upper and lower casing side track surfaces 3c and 3d and the two upper and lower return passageways 8a and 8b corresponding thereto are coupled by the two direction turning passageways 6a and 6b in the side plates 4. Consequently, two large and small endless rolling element circulating passageways having different lengths, which will be explained hereinlater, are formed in the casing.

By substantially equalizing diameters of the rollers and balls, both of the rollers and balls can be allowed to pass on the same endless circulating passageway, so that there is an advantage such that the common parts can be used.

As shown in FIGS. 1 and 3, in the large roller endless circulating passageway formed in the slide unit 2 according to the preferred embodiment of the invention, the rollers 7b in the loaded region existing in the casing side track surface 3d are smoothly rolled and guided by the guide surface 3e formed in the width direction of the track surface 3d of the casing 3 so as not to cause a skew. The rollers 7b which have reached the edge surface of the lower holding plate 5b are led to the direction turning passageway 6b in the side plate 4 and are further smoothly moved from the direction turning passageway 6b in the side plate 4 to the return passageway 8b in the casing 3.

Figure 4:
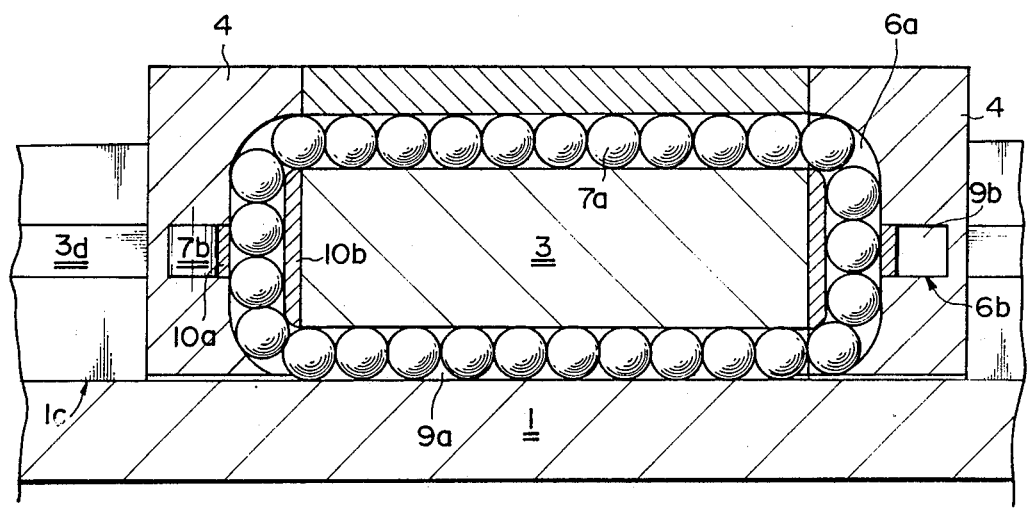
FIG. 4 is a cross sectional view taken along the line A—A in FIG. 3.
Figure 5:
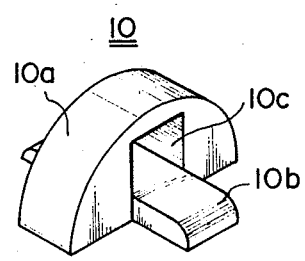
FIG. 5 is a perspective view of a spacer forming an inner wall surface of a direction turning passageway which is provided in a side plate.

FIGS. 1 and 3 show a state in which the two large and small endless circulating passageways in each of the vertical depending portions 3b of the casing according to the present invention are arranged so as to perpendicularly cross each other. FIG. 4 shows a short inner small endless circulating passageway 9a for the balls and a long outer large endless circulating passageway 9b for the rollers when they are seen in the cross sectional direction of the casing. FIG. 5 shows the inner small endless circulating passageway 9a which is completely enclosed in the loop of the outer large endless circulating passageway 9b.

FIGS. 4 and 5 show a construction of a direction turning passageway spacer 10 which forms both of the endless circulating passageways 9a and 9b in each of the side plates 4 together with the respective rolling element load track and return passageway. Thus, an arrangement in which the large and small endless circulating passageways cross perpendicularly each other is obtained. That is, what is called a traffic arrangement of the rollers and balls which roll on the direction turning passageways 6b and 6a of the two large and small endless circulating passageways 9b and 9a which perpendicularly cross each other in the cross sectional view is executed by the spacer 10 shown in FIG. 5. The spacer 10 itself is fitted and fixed into each of the side plates 4 attached to both ends of the casing 3. The spacer 10 comprises: a single half circle-shaped direction turning passageway inner wall surface 10a for the rollers which is used for the large endless circulating passageway; and a direction turning passageway inner wall surface 10b for the balls which is used for the small endless circulating passageway and is arranged so as to cross perpendicularly to a tunnel-like concave portion (hereinafter, referred to as a tunnel portion) 10c formed in the almost central lower portion of the direction turning passageway spacer 10 as shown in FIG. 5. When the spacer is attached, a cross-shaped concave groove serving as an outer peripheral wall surface of the direction turning passageway is formed at the attaching position of the side plate 4. The spacer is inserted and fixed into the concave groove, thereby forming an inner peripheral wall surface of the direction turning passageway. The balls 7a pass in the tunnel portion 10c formed in the spacer 10 and move to the small endless circulating passageway return hole and relevant casing side track surface.

The side plate 4 and spacer 10 are easily made of a synthetic resin. The rolling element holding plates 5a and 5b are mainly formed by a metal although they can be formed by a friction resistant synthetic resin.

FIG. 3 shows a cross sectional view of the right half of the guide unit of the invention and illustrates the relative positions of the direction turning passageways 6a and 6b for the balls and rollers in the side plate 4 and of the upper and lower casing side track surfaces 3c and 3d and the return passageways 8a and 8b for the balls and rollers in the casing 3.

In the endless rectilinear motion rolling guide unit comprising total four tracks of two upper right and left and two lower right and left tracks according to the invention, the shape of each of the direction turning passageways 6b formed in the large endless circulating passageways 9b for the rollers having a long circulating length is preferably set to an almost single arc. On the other hand, each of the direction turning passageways 6a which are formed in the small endless circulating passageways 9a for the balls having a short circulating length is preferably constructed by both of an arc portion and a straight line portion. However, so long as both of the two large and small endless circulating passageways which cross perpendicularly each other can be constructed by the foregoing special arrangement, the direction turning passageway in each of the circulating passageways can be obviously set into any shape.

The embodiment has been described with respect to the example in which the roller rolling elements are used for the large endless circulating passageway and the ball rolling elements are used for the small endless circulating passageway. However, in the case where a load weight is applied from the lower position or the like, it is also possible to combine an endless circulating passageway of a long length having a load track surface for the rollers at the upper stage and an endless circulating passageway of a short length having a load track surface for the balls at the lower stage. Further, it is also possible to construct in a manner such that both of the cross-shaped endless circulating passgeways are constructed so as to have the same shape and the same circulating length and are combined like a chain coupling type, the ball rolling elements are inserted to one of the endless circulating passageways, and the roller rolling elements are inserted to the other passageway.

According to the foregoing special construction of the cross-shaped endless circulating passageways comprising the total four passageways of two upper right and left and two lower right and left tracks of the invention, the lengths of the load track surfaces of each of the circulating passageways can be equalized. Preferably, by using the balls as rolling elements for the upper load track surface and by using the rollers as rolling elements for the lower load track surface, the following advantages are obtained.

(1) As compared with the conventional guide unit, the guide unit can be miniaturized and the application range is widened.
(2) As compared with the type in which the track parts are separated, the rigidity of the casing extremely increases.
(3) As compared with the size of the casing, a larger downward weight can be loaded (the elastic displacement amount of the rollers=$\frac{1}{2}$ to $\frac{1}{3}$ of that of the balls).
(4) Among the total four right, left, upper, and lower rolling element track surfaces, the balls are used in place of the rollers for the two track surfaces, so that the cost can be reduced.
(5) The frictional resistance can be reduced as compared with the guide unit in which the rollers are used for all of the four track surfaces.
(6) Since the angular contact type balls are used, even if a variation of the rectilinear motion rolling accuracy exists among the rollers on the two upper track surfaces, it can be adjusted and absorbed on the side of the balls.
(7) A desired combination can be used without losing the characteristics of the rollers and balls.
(8) When the diameters of the rollers and the balls are substantially equalized, it is advantageous because the common parts can be used or the like.

(9) Since the direction during radius of the large endless circulating passageway can be largely set, the slide resistance can be reduced as a unit.

The present invention is not limited to the foregoing embodiment but many modifications and variations are possible within the spirit and scope of the appended claims of the invention.

What is claimed is:

1. A rectilinear motion rolling guide unit comprising:
   a long track rail (1) having an almost I-shaped cross section;
   a casing (3) having an almost inverse U-shaped cross section; and
   a number of rolling elements (7a and 7b) which are interposed between said track rail (1) and said casing (3),
   wherein the casing (3) has a cavity portion (3a) having an almost inverse U-shaped cross section in an almost central lower portion of the casing and is arranged so as to ride over said track rail (1) through said cavity portion (3a),
   lower corner portions of upper projecting portions (1a) and upper corner portions of lower projecting portions (1b) which are provided on both sides of the track rail (1) are respectively chamfered into inclined surfaces, thereby forming two upper and lower rail side track surfaces (1c and 1d),
   two upper and lower casing side track surfaces (3c and 3d) are formed on an inner peripheral surface of said cavity portion (3a) of the casing (3) at positions corresponding to said two upper and lower rail side track surfaces (1c and 1d),
   said rolling elements (7a and 7b) are inserted between said corresponding rail side and casing side track surfaces (between 1c and 3c and between 1d and 3d), thereby allowing the relative free slide motion between the track rail (1) and the casing (3) which rides over the track rail to be executed,
   rolling element return passageways (8a and 8b) for said two upper and lower casing side track surfaces (3c and 3d) are respectively formed in the casing,
   side plates (4) each having two direction turning passageways (6a and 6b) for the rolling elements (7a and 7b) which roll and run on the two upper and lower casing side track surfaces (3c and 3d) are respectively attached to both end portions in the longitudinal direction of the casing,
   the two upper and lower casing side track surfaces (3c and 3d) and the return passageways (8a and 8b) corresponding thereto are respectively coupled, thereby forming two endless rolling element circulating passgeways (9a and 9b) into the casing (3),
   said two endless circulating passageways (9a and 9b) are arranged so as to perpendicularly cross each other when they are seen in a cross sectional view of the casing,
   lengths of load track surfaces (10a and 10b) of said endless circulating passageways (9a and 9b) are set to be substantially equal,
   ball rolling elements (7a) are rolled on the load track surfaces (10b) and roller rolling elements (7b) which are arranged in parallel are rolled on the other load track surface (10a).

2. A guide unit according to claim 1, wherein said two endless circulating passageways (9a and 9b) which are formed in said casing (3) and are arranged so as to perpendicularly cross each other have two large and small circulating lengths,
   the small endless circulating passageway (9b) having the shorter length is completely enclosed in a loop of the large endless circulating passageway (9a) having the longer length, and
   lengths of the load track surfaces (10a and 10b) of said endless circulating passageways are set to be substantially equal.

3. A guide unit according to claim 2, wherein in the two endless circulating passageways (9a and 9b) which are formed in the casing (3) and are arranged so as to perpendicularly cross each other, the small endless circulating passageway (9b) having the shorter length and whose load track surface (10b) is located at the upper stage is completely enclosed in the loop of the large endless circulating passageway (9a) having the longer length and whose load track surface (10a) is located at the lower stage,
   the lengths of the load track surfaces (10a and 10b) of said endless circulating passageways (9a and 9b) are set to be substantially equal,
   the ball rolling elements (7a) are rolled on the upper load track surface (10a) and the roller rolling elements (7b) which are arranged in parallel are rolled on the lower load track surface (10b).

4. A guide unit according to claim 3, further comprising a direction turning passageway spacer (10) which forms said large and small endless circulating passageways (9b and 9a) into each of said side plates (4) together with said load track surfaces (10b and 10a) and said return passageways (8b and 8a),
   and wherein said spacer (10) is constructed by:
   the single half circle-shaped inner wall load track surface (10a) of the direction turning passageway for the roller rolling elements (7b) for the large endless circulating passgeway (9a); and
   the inner wall load track surface (10b) of the direction turning passageway for the ball rolling elements (7a) for the small endless circulating passageway (9b), and the inner wall load track surface (10b) is formed so as to perpendicularly cross a tunnel-shaped concave portion (10c) formed in an almost central lower portion of said spacer (10).

* * * * *